United States Patent [19]

Hollabaugh et al.

[11] 4,244,794
[45] Jan. 13, 1981

[54] HYDROGEN PRODUCTION BY THE DECOMPOSITION OF WATER

[75] Inventors: Charles M. Hollabaugh; Melvin G. Bowman, both of Los Alamos, N. Mex.

[73] Assignee: The United States of America as represented by the United States Department of Energy, Washington, D.C.

[21] Appl. No.: 62,373

[22] Filed: Jul. 31, 1979

[51] Int. Cl.³ .......................... C25B 1/04; C25B 1/22
[52] U.S. Cl. ..................................... 204/104; 204/129
[58] Field of Search ............................... 204/129, 104

[56] References Cited

U.S. PATENT DOCUMENTS

| 704,831 | 7/1902 | Jacobs . | |
|---|---|---|---|
| 3,888,750 | 6/1975 | Brecher et al. | 204/129 |
| 4,059,496 | 11/1977 | Schulten et al. | 204/104 |
| 4,080,436 | 3/1978 | Fremery et al. | 204/129 |
| 4,089,939 | 5/1978 | Norman et al. | 423/648 R |
| 4,089,940 | 5/1978 | Norman et al. | 423/648 R |
| 4,127,644 | 11/1978 | Norman et al. | 423/648 R |

OTHER PUBLICATIONS

"Fundamental Aspects of Systems for the Thermochem. Prod. of $H_2$ from $H_2O$", by M. G. Bowman, pp. 1-10, 1974.

"$H_2$ Prod. by Low Voltage Electrolysis in Combined Thermochem. & Electrochem. Cycles", by M. G. Bowman et al., E.C.S. Abstract No. 232, 1974.

*Primary Examiner*—R. L. Andrews
*Attorney, Agent, or Firm*—James E. Denny; Paul D. Gaetjens; Elizabeth O. Slade

[57] ABSTRACT

How to produce hydrogen from water was a problem addressed by this invention. The solution employs a combined electrolytical-thermochemical sulfuric acid process. Additionally, high purity sulfuric acid can be produced in the process.

Water and $SO_2$ react in electrolyzer (12) so that hydrogen is produced at the cathode and sulfuric acid is produced at the anode. Then the sulfuric acid is reacted with a particular compound $M_rX_s$ so as to form at least one water insoluble sulfate and at least one water insoluble oxide of molybdenum, tungsten, or boron. Water is removed by filtration; and the sulfate is decomposed in the presence of the oxide in sulfate decomposition zone (21), thus forming $SO_3$ and reforming $M_rX_s$. The $M_rX_s$ is recycled to sulfate formation zone (16). If desired, the $SO_3$ can be decomposed to $SO_2$ and $O_2$; and the $SO_2$ can be recycled to electrolyzer (12) to provide a cycle for producing hydrogen.

10 Claims, 3 Drawing Figures

HYDROGEN PRODUCTION BY THE DECOMPOSITION OF WATER

BACKGROUND OF THE INVENTION

1. Field of the Invention

This invention relates generally to the production of hydrogen gas from water and in particular relates to a sulfuric acid process for producing hydrogen. It is a result of a contract with the Department of Energy (contract No. W-7405-ENG-36).

2. Description of the Prior Art

In recent years, much effort has been directed toward development of an economically viable process for the production of hydrogen by the decomposition of water. Investigation of the use of a sulfuric acid cycle for producing hydrogen has been a very popular area of research because of the favorable thermodynamic considerations of such a cycle and because of the fact that methods of handling sulfuric acid have long been known.

Several sulfuric acid cycles for the production of hydrogen have been proposed. These include reactions described in U.S. Pat. Nos. 4,089,939, 4,089,940, and 4,127,644, issued to Norman et al., all of which involve iodine. In these processes, sulfuric acid solutions must be dried (i.e., distilled); and the large amount of heat required for this drying is a major contributor to lowered efficiency in these processes.

U.S. Pat. No. 3,888,750, Brecher et al., discloses a hybrid system employing both electrolysis and thermochemical steps. In that process, aqueous sulfuric acid solutions are dried prior to thermal decomposition of the acid. And the combination process is different from that of this invention.

Other processes for the production of hydrogen from water utilizing the electrolysis of aqueous sulfuric acid include U.S. Pat. No. 4,080,436, Fremery et al., U.S. Pat. No. 4,059,496, Schulten et al., and U.S. Pat. No. 704,831, Jacobs. These processes involve combinations of steps which are different from the combination of this invention, however.

Despite the existence of the above-recited processes in the prior art, however, a need exists for a sulfuric acid process employing relatively inexpensive reactants in a cycle wherein large amounts of energy are not required to dry solutions and wherein no step in the overall process requires a temperature higher than 1300° K.

3. Objects of the Invention

It is an object of this invention to produce hydrogen gas from water by a sulfuric acid process employing electrolysis and thermo-chemical decomposition.

It is a further object of this invention to produce concentrated sulfuric acid, as well as hydrogen gas.

Other objects, advantages, and novel features of the invention will become apparent to those skilled in the art upon examination of the following detailed description of preferred embodiments of the invention and the accompanying drawing.

SUMMARY OF THE INVENTION

According to the invention, hydrogen gas is produced from water in a process comprising:

(1) passing an electric current from a cathode to an anode through water containing sulfur dioxide ($SO_2$) so as to produce hydrogen ($H_2$) gas at the cathode and so as to oxidize the sulfur dioxide to form sulfuric acid ($H_2SO_4$) at the anode;

(2) separating the produced hydrogen gas from the aqueous solution of sulfuric acid;

(3) adding to the aqueous solution of sulfuric acid at least one compound selected from the group consisting of $M_rX_s$, wherein M is at least one metal ion selected from the group consisting of $Ba^{+2}$, $Ca^{+2}$, $Sr^{+2}$, $La^{+3}$, and $Pb^{+2}$, wherein X is at least one radical selected from the group consisting of the radicals molybdate ($MoO_4^{-2}$), tungstate ($WO_4^{-2}$), and metaborate ($BO_2^{-1}$), wherein r is either 1 or 2, and wherein s is either 1, 2, or 3, r and s depending upon the valence of M and of X, thus producing a mixture of a water insoluble sulfate of M and a water insoluble oxide of Mo, W, or B;

(4) filtering the precipitated mixture of water insoluble sulfate and water insoluble oxide;

(5) heating the mixture of sulfate and oxide to a temperature which is sufficiently high to form sulfur trioxide ($SO_3$) gas and to re-form $M_rX_s$;

(6) separating the sulfur trioxide gas from the re-formed $M_rX_s$ and (7) recycling the reformed $M_rX_s$ to step (3) above.

Also according to the invention, in one embodiment, the $SO_3$ is dissolved is a small amount of water to produce concentrated $H_2SO_4$.

Alternatively according to the invention, in one embodiment, the following steps 8 and 9 are performed directly following steps 1–7 listed above to produce $SO_2$ and $O_2$:

(8) decomposing the sulfur trioxide gas by heating to a sufficiently high temperature to re-form sulfur dioxide and to form oxygen gas; and (9) separating the sulfur dioxide from the oxygen.

also according to the invention, in one embodiment, the produced sulfur dioxide is recycled to step (1) (above) to provide a continuous process for the production of hydrogen in which only water need be added in substantial amount.

Thus for one embodiment, the following set of equations succinctly describe the reactions involved in that embodiment:

(a) 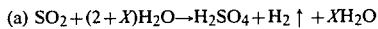

(b) 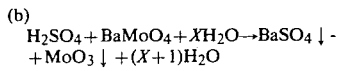

(c) 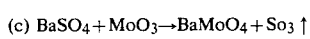

(d) 

DESCRIPTION OF THE PREFERRED EMBODIMENTS

Figure 1:
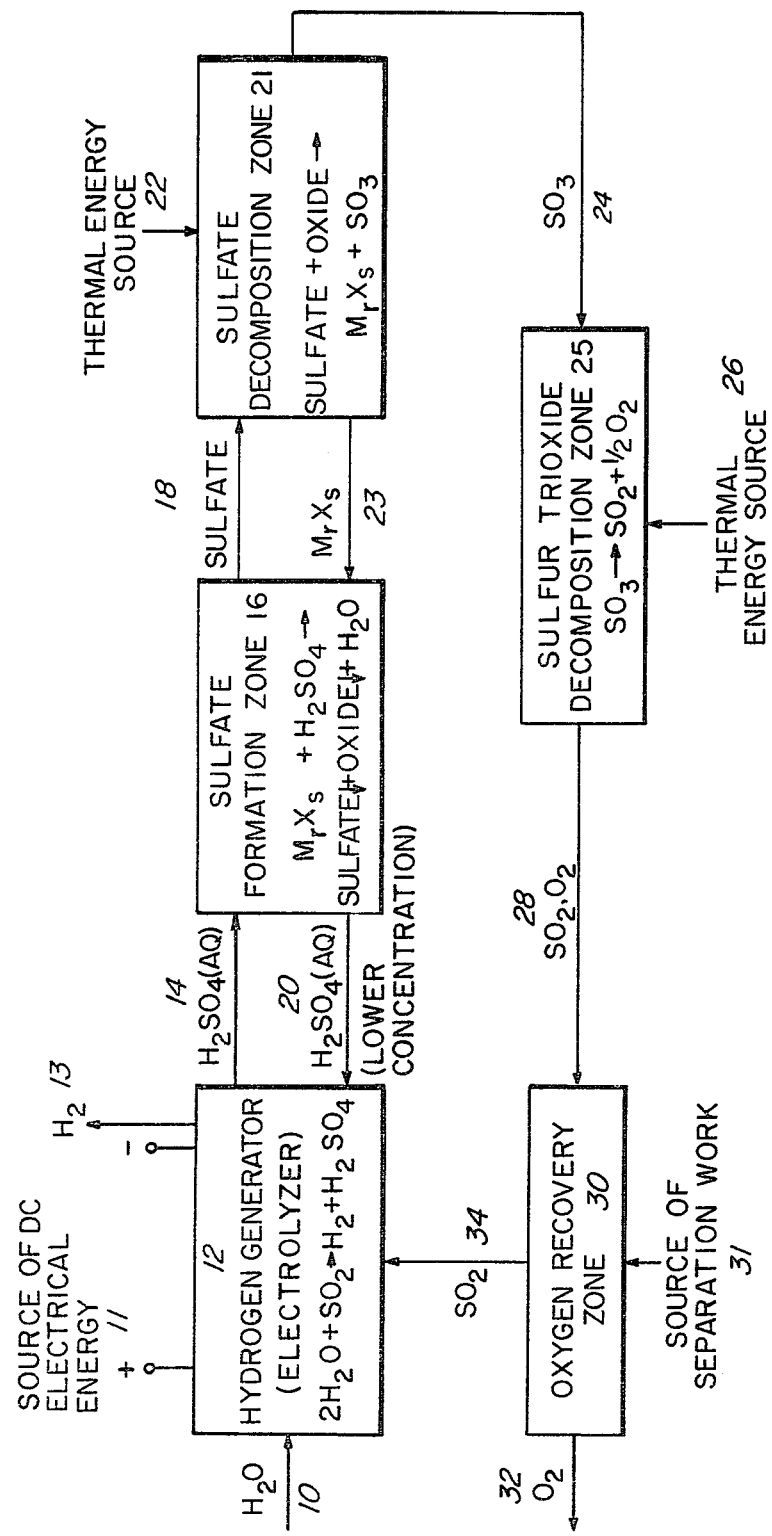
FIG. 1 is a schematic illustration of the steps in an embodiment of the invention utilizing a sulfuric acid hybrid thermochemical-electrolytical cycle to produce hydrogen.

It should be noted that the method according to the invention exhibits the following combination of advantages:

1. The cost of materials in this process is low due to the choice of materials and due to the high decomposition rate exhibited in the decomposition of the sulfate. When feedback loops are used, the cost of materials is further lowered.

2. When a dilute solution of sulfuric acid is used in step (3) given above in the Summary of the Invention, the voltage required will be less and overvoltage and cell resistance problems will be lower than when concentrated sulfuric acid is used.

3. Large amounts of energy are not required to dry sulfuric acid solutions, as are required in some methods in the prior art. Here, it should be noted that a filtration step (step 4) is used to remove most of the water before the solid sulfate is subjected to further treatment. When the sulfate is being heated to its decomposition temperature, any remaining water will be quickly driven off and can be removed from the solid sulfate and oxide before the sulfate decomposition temperature is reached. Then, because the sulfur trioxide is dry, it is less corrosive than it would be if it had not been dried.

4. The reaction rate in the sulfate decomposition reaction (step 5) is enhanced by the presence of molten oxide; and the temperature required to decompose the sulfate in step (5) is significantly lowered due to the presence of the oxide. This lowering is important because the decomposition temperature of water insoluble sulfates is very high.

5. Separation of products is not a problem in any step of the reaction. In step 5, for example, any unreacted dried sulfate and oxide in step 5 need not be separated from the re-formed $M_rX_s$. Instead, these unreacted materials can be recycled to step 3 and will not interfere with the reaction in that step.

6. The temperatures which are required for each step in the process are relatively low. Hence, existing technology can be used.

7. Because a thermochemical step is used as part of the process, solar energy or waste heat from nuclear reactors can be stored by means of this process.

8. Considerably less energy is required to run the electrolysis step (step 1) in the process according to the invention than is required to electrolyze water directly in a one step process, at least 1.229 volts being required for the reaction $2H_2O \rightarrow 2H_2 + O_2$ to proceed. About 0.17 applied volts are required for the reaction $H_2SO_3 + H_2O \rightarrow H_2SO_4 + H_2$ to proceed when the concentration of aqueous $H_2SO_4$ is 1 molar. When the concentration of $H_2SO_4$ is lower than 1 molar, lower voltage can be used; and when the concentration is higher than 1 molar, higher voltage is used.

9. In another embodiment wherein $SO_3$ is removed from the system instead of being decomposed, hydrogen gas as well as concentrated sulfuric acid can be produced by dissolving the $SO_3$ recovered from the sulfate decomposition step in a small amount of water.

Referring to the drawing, in FIG. 1, in one embodiment water is fed via conduit 10 into hydrogen generator (i.e., electrolyzer) 12, to which a source of DC electrical energy 11 is applied so that an electric current is passed from a cathode to an anode through water containing sulfur dioxide. At the cathode, hydrogen gas is produced and recovered in conduit 13 as a product; and at the anode, sulfur dioxide is oxidized to form sulfuric acid.

The produced aqueous sulfuric acid is then fed via conduit 14 into sulfate formation zone 16, where it reacts with a compound $M_rX_s$ thus producing a sulfate of M and an oxide and water, the sulfate and oxide both being insoluble in water and being easily separated from the water by filtration. The solid sulfate and solid oxide after being filtered are then fed via conduit 18 into sulfate decomposition zone 21. The water separated from the water insoluble sulfate and water insoluble oxide, together with any unreacted aqueous sulfuric acid, is recycled to hydrogen generator 12 via conduit 20.

In sulfate decomposition zone 21, thermal energy source 22 provides heat so that the sulfate and oxide react to re-form $M_rX_s$ and to form sulfur trioxide gas. The gaseous product $SO_3$ is easily separated from the $M_rX_s$ and from any unreacted material, and the non-gaseous materials are recycled back to sulfate formation zone 16 via conduit 23. The sulfur trioxide gas is removed via conduit 24 and passed into sulfur trioxide decomposition zone 25.

A source of thermal energy 26 supplies energy required for decomposition of sulfur trioxide. The products of that decomposition, $SO_2$ and $O_2$, are fed via conduit 28 into oxygen recovery zone 30, wherein $SO_2$ is separated from $O_2$ by cooling, using a source of separation work 31. The $O_2$ is then recovered as a product via conduit 32 and the $SO_2$ can be recycled back via conduit 34 to hydrogen generator 12.

Hydrogen generator 12 can be operated at any suitable combination of conditions (including temperature, pressure, voltage, and concentration of $SO_2$) for producing hydrogen gas at the cathode and sulfuric acid at the anode. Suitable operating conditions for this reaction have been widely discussed in the art (for example, see Brecher et al., U.S. Pat. No. 3,888,750) and will not be discussed in detail in this specification. However, it should be noted that because the sulfate formation which takes place in zone 16 can employ dilute sulfuric acid, the voltage which can be utilized in hydrogen generator 12 can be as low as about 0.17 volt for 1 M (molar) $H_2SO_4$.

In sulfate formation zone 16, the sulfuric acid produced in zone 12 reacts with a compound, $M_rX_s$, so as to produce a water insoluble sulfate and a water insoluble oxide. Any material which forms a water insoluble sulfate can be used in the practice of the invention, including barium, calcium, strontium, lanthanum, and lead. However, as illustrated below in the experimental demonstrations, barium and calcium are preferred because they provide the best reaction rates in sulfate decomposition zone 20. The metal lanthanum may prove to be most preferred, however, based on the fact that during an unverified run, lanthanum sulfate was decomposed in zone 20 more rapidly than any other sulfate.

The radical X can be molybdate ($MoO_4^{-2}$), tungstate ($WO_4^{-2}$), metaborate ($BO_2^{-}$), or any mixture thereof. These radicals react with sulfuric acid to produce a water insoluble oxide of either molybdenum, tungsten, boron, or a mixture thereof, and thus are suitable for being separated by filtration from water or from an aqueous solution of sulfuric acid.

The concentration of the sulfuric acid in sulfate formation zone 16 can be any concentration; and, based upon thermodynamic calculations, the sulfate formation reaction will proceed. However, the $H_2SO_4$ concentration will generally be less than about 1 molar. Such a dilute sulfuric acid concentration is especially desirable in the practice of the invention for reasons set forth above.

When dilute $H_2SO_4$ is used, in order to facilitate its reaction with $M_rX_s$, the latter can be added to the liquid dilute $H_2SO_4$; and the mixture of liquid and solid can be ground to form a slurry.

The molar ratio of sulfuric acid: $M_rX_s$ will generally be about 1:1.

After the sulfate formation reaction has taken place, the solid reaction products are separated from the water or aqueous sulfuric acid solution by filtration and the filtrate is then recycled back to the hydrogen generator. Heat will then be applied to the solids, thus driving off the remaining water. The thus-produced water vapor can be removed from zone 21 through a valve (not shown).

The dried water-insoluble sulfate is then decomposed in the presence of the dried water-insoluble oxide under suitable decomposition conditions to produce sulfur trioxide gas and the starting material $M_rX_s$ used in zone 16. The temperature required to decompose the sulfate will be below 1300° K. for the materials recited above. However, if desired, higher temperatures can be used, especially if a continuous reaction in this zone is used. If a batch reaction is used the vapor pressure of the oxide sets an effective upper limit on a suitable temperature, more of the oxide being lost from the system in a batch process as the temperature is raised. For this reason, a continuous process is preferred over a batch process.

The lower limit on the temperature of the reaction in sulfate decomposition zone 21 is the melting point of the oxide used.

As shown below in the experimental demonstration, when the oxide which reacts in sulfate decomposition zone 21 with the insoluble sulfate is such that it forms a molten material during the sulfate decomposition reaction, the decomposition reaction rate is high during even the first ten minutes of the decomposition reaction. Of the group molybdenum trioxide, tungsten trioxide, and boron oxide, molybdenum trioxide has been found to provide a very good reaction rate for the decomposition both of barium sulfate and calcium sulfate. Thus, molybdenum trioxide is at this time the preferred oxide.

The sulfur trioxide produced in sulfate decomposition zone 21 is very readily separated from other reaction products and from any unreacted starting material since only the sulfur trioxide is a gas at temperatures at or below about 1000° K. Furthermore, because of the formation and removal of the gaseous product, the sulfate decomposition reaction is driven toward completion.

The produced and separated sulfur trioxide gas can be used in any further process requiring relatively pure sulfur trioxide. For example, if desired, sulfur trioxide can be dissolved in a small amount of water, thus forming very pure concentrated sulfuric acid.

In order to provide a cycle for the production of hydrogen in which substantial amounts only of water are needed, the sulfur trioxide should however be subjected to the following two steps, as represented in the drawing at zone 25 and zone 30. In zone 25, the sulfur trioxide is decomposed to form sulfur dioxide and oxygen by the addition of thermal energy. This reaction is well known in the art (see for example, Brecher et al., U.S. Pat. No. 3,888,750 at columns 6–8) and will not be described here in detail.

The mixture of sulfur dioxide and oxygen produced in sulfur trioxide decomposition zone 25 together with any unreacted sulfur trioxide are fed into oxygen recovery zone 30, where the mixture is cooled. The $SO_3$ liquifies (at 760 mm Hg) at about 44.6° C.; and the $SO_2$, at about $-10°$ C. Thus, the $SO_3$ and $SO_2$ can be fractionally separated from each other and from the $O_2$. The thus separated $SO_2$ is then recycled via conduit 34 to hydrogen generator 12, where it is introduced into water and reused to form hydrogen and sulfuric acid, as described above. The separated $SO_3$ can be recycled to sulfur trioxide decomposition zone 25 or used in any other process as desired.

If desired, the oxygen produced and separated from the sulfuric acid in zone 30 can be used in any further process requiring relatively pure gaseous oxygen.

EXPERIMENTAL DEMONSTRATIONS

Although a complete example illustrating all of the steps of the invention is not available, the following experiments on the sulfate decomposition which takes place in zone 21 were carried out and are directly correlatable with the invention. The remainder of the steps in the process of the invention are either very well known in the art (i.e., the electrolysis step, the sulfur trioxide decomposition reaction, and the separation of $SO_2$ from $O_2$) or based on thermodynamic calculations will undoubtedly proceed (i.e., the sulfate formation step).

In the following experiments, the reaction rates of the decomposition of various sulfates in the presence of various oxides were investigated. Tables 1 through 13 show in tabular form the results of these investigations, showing the fraction of the sulfate which has been reacted as a function of time. The molar ratio of sulfate:oxide present at the beginning of the reaction is indicated on each table, as well as the temperature employed.

| FRACTION OF $BaSO_4$ REACTED WITH $MoO_3$ (AS A FUNCTION OF TIME) | | | | | | | | | |
|---|---|---|---|---|---|---|---|---|---|
| Temperature (K) | Table 1 1125 | | | Table 2 1175 | | | Table 3 1225 | | |
| Ratio of sulfate:oxide | 0.5 | 1.0 | 2.0 | 0.5 | 1.0 | 2.0 | 0.5 | 1.0 | 2.0 |
| Time (minutes) | | | | | | | | | |
| 1 | .14 | .10 | .08 | .19 | .13 | .07 | .24 | .16 | .08 |
| 2 | .21 | .15 | .10 | .27 | .21 | .09 | .35 | .27 | .13 |
| 3 | .24 | .17 | .11 | .33 | .27 | .12 | .43 | .30 | .18 |
| 4 | .27 | .20 | .12 | .36 | .29 | .14 | .48 | .33 | .21 |
| 5 | .29 | .21 | .13 | .39 | .31 | .16 | .51 | .35 | .24 |
| 6 | .31 | .22 | .14 | .41 | .32 | .17 | .54 | .36 | .26 |
| 7 | .32 | .23 | .14 | .43 | .33 | .18 | .56 | .38 | .28 |
| 8 | .33 | .23 | .15 | .44 | .33 | .19 | .57 | .39 | .29 |
| 9 | .34 | .24 | .15 | .46 | .34 | .20 | .59 | .40 | .31 |
| 10 | .35 | .25 | .16 | .47 | .34 | .21 | .60 | .41 | .32 |
| 11 | .36 | .25 | .16 | .48 | .35 | .22 | .62 | .42 | .34 |
| 12 | .36 | .26 | .16 | .49 | .36 | .23 | .63 | .43 | .35 |
| 13 | .37 | .26 | .17 | .50 | .36 | .24 | .64 | .44 | .36 |
| 14 | .38 | .27 | .17 | .50 | .37 | .24 | .65 | .45 | .37 |
| 15 | .38 | .27 | .17 | .51 | .37 | .25 | .66 | .46 | .38 |
| 16 | .39 | .27 | .18 | .52 | .38 | .26 | .67 | .47 | .39 |
| 17 | .40 | .28 | .18 | .53 | .38 | .26 | .67 | .48 | .40 |
| 18 | .40 | .28 | .18 | .53 | .39 | .27 | .68 | .48 | .41 |
| 19 | .40 | .28 | .18 | .54 | .39 | .27 | .69 | .49 | .42 |
| 20 | .41 | .29 | .19 | .55 | .40 | .28 | .70 | .50 | .43 |

In Tables 1 through 3, the sulfate reacted with barium sulfate and the oxide reacted with molybdenum trioxide. Comparing the results shown in these tables for the first ten minutes, one can see that, as expected, the higher the reaction temperature the faster the reaction rate (as obtained from the quotient of the fraction of $BaSO_4$ reacted divided by the corresponding time in each instance for a given starting molar ratio of sulfate:oxide). Also, at the end of the first ten minute period, the fraction of sulfate reacted is highest for the highest temperature, other variables being held constant. The first ten minute period is compared for the reactants in each of the experiments because it is desired that as high a reaction rate as possible be achieved in as short a time period as possible, thus obviating a large inventory of reactant material.

In comparing the results obtained with a given sulfate and a given oxide with another sulfate and another oxide, one should compare results obtained at the same temperature.

It should be noted that in Tables 1 through 3, molybdenum trioxide was a liquid at all temperatures employed. Furthermore, the best results were obtained with a starting molar ratio of sulfate:oxide of 0.5.

In Tables 4 through 6, the sulfate was calcium sulfate and the oxide was molybdenum trioxide. It should be noted that for all the temperatures employed, the oxide was molten. For the first ten minutes of the reaction, the results of which are shown in Tables 4 through 6, results very similar to those for Tables 1 through 3 were obtained except that a starting molar ratio of sulfate:oxide of 1.0 appeared to give the best results.

| FRACTION OF $CaSO_4$ REACTED WITH $MoO_3$ (AS A FUNCTION OF TIME) | | | | | | | | | | | | |
|---|---|---|---|---|---|---|---|---|---|---|---|---|
| Temperature (K) | Table 4 1125 | | | | Table 5 1175 | | | | Table 6 1225 | | | |
| Ratio of sulfate:oxide | .5 | .75 | 1.0 | 2.0 | .5 | .75 | 1.0 | 2.0 | .5 | .75 | 1.0 | 2.0 |
| Time (minutes) | | | | | | | | | | | | |
| 1 | .10 | .10 | .08 | .04 | .20 | .15 | .12 | .07 | .26 | .23 | .19 | .14 |
| 2 | .17 | .17 | .12 | .07 | .28 | .26 | .21 | .15 | .39 | .33 | .30 | .29 |
| 3 | .25 | .22 | .17 | .09 | .37 | .31 | .27 | .22 | .48 | .39 | .40 | .36 |
| 4 | .30 | .24 | .20 | .12 | .41 | .33 | .33 | .29 | .52 | .41 | .48 | .37 |
| 5 | .33 | .26 | .22 | .15 | .43 | .36 | .37 | .34 | .56 | .45 | .54 | .38 |
| 6 | .35 | .27 | .24 | .17 | .45 | .39 | .42 | .39 | .59 | .47 | .58 | .39 |
| 7 | .37 | .28 | .26 | .20 | .46 | .42 | .46 | .42 | .62 | .49 | .63 | .40 |
| 8 | .38 | .29 | .28 | .22 | .47 | .44 | .51 | .43 | .64 | .52 | .67 | .40 |
| 9 | .39 | .30 | .30 | .24 | .47 | .46 | .54 | .43 | .65 | .53 | .69 | .40 |
| 10 | .40 | .32 | .32 | .26 | .48 | .47 | .57 | .44 | .66 | .55 | .70 | .40 |
| 11 | .41 | .33 | .34 | .27 | .48 | .49 | .59 | .44 | .67 | .57 | .71 | .40 |
| 12 | .41 | .34 | .36 | .29 | .49 | .51 | .62 | .44 | .68 | .59 | .72 | .40 |
| 13 | .42 | .35 | .38 | .31 | .50 | .52 | .63 | .44 | .69 | .61 | .73 | .40 |
| 14 | .42 | .37 | .40 | .33 | .50 | .54 | .65 | .45 | .70 | .63 | .73 | .41 |
| 15 | .43 | .38 | .41 | .34 | .51 | .55 | .66 | .45 | .71 | .65 | .73 | .41 |
| 16 | .43 | .39 | .43 | .36 | .52 | .57 | .66 | .45 | .72 | .66 | .74 | .41 |
| 17 | .43 | .40 | .44 | .37 | .52 | .58 | .67 | .45 | .73 | .68 | .74 | .41 |
| 18 | .43 | .41 | .46 | .38 | .53 | .59 | .67 | .45 | .74 | .70 | .74 | .41 |
| 19 | .44 | .42 | .48 | .39 | .53 | .61 | .68 | .45 | .75 | .72 | .74 | .41 |
| 20 | .44 | .43 | .49 | .40 | .54 | .62 | .68 | .46 | .76 | .74 | .75 | .41 |

In Table 7, the sulfate was barium sulfate and the oxide was tungsten trioxide. At 1275° K. (the only temperature investigated), neither the sulfate alone nor the oxide alone would have been molten; however, when the two reacted to produce barium tungstate, the latter in the presence of tungsten trioxide formed a liquid at 1275° K.

In Tables 8 through 10, the sulfate employed was calcium sulfate and the oxide was tungsten oxide; and no liquid was present in any of these experiments. It is believed that at these temperatures, the reaction probably proceeds via a vapor-solid reaction, although this has not been further investigated.

In Tables 11 through 13, the sulfate employed was calcium sulfate and the oxide was a mixture of tungsten trioxide and molybdenum trioxide. Why the mixture of two oxides with the sulfate gave worse results than when only one oxide was used is not fully understood. Provided on each table are the starting molar ratios of sulfate:oxide. The starting molar ratio of tungsten oxide:molybdenum oxide was 9.0 in each case.

From the experimental results displayed in these tables, it is apparent that the fastest reaction rates are obtained when the molar ratio of sulfate:oxide is about 0.5, regardless of the temperature employed and regardless of the starting reactants, at least during the first ten minutes of the reaction, with the exception of the results shown in Tables 5 and 6.

| FRACTION OF $BaSO_4$ REACTED WITH $WO_3$ (AS A FUNCTION OF TIME) | | | | | | |
|---|---|---|---|---|---|---|
| Temperature (K) | Table 7 1275 | | | | | |
| Ratio of sulfate:oxide | .40 | .50 | .57 | .66 | .99 | 1.32 |
| Time (minutes) | | | | | | |
| 1 | .05 | .06 | .06 | .06 | .04 | .05 |
| 2 | .11 | .12 | .12 | .13 | .09 | .12 |
| 3 | .17 | .18 | .18 | .18 | .15 | .18 |
| 4 | .23 | .23 | .22 | .23 | .20 | .20 |
| 5 | .29 | .27 | .26 | .27 | .23 | .24 |
| 6 | .32 | .31 | .30 | .30 | .26 | .28 |
| 7 | .35 | .34 | .33 | .33 | .29 | .30 |
| 8 | .38 | .36 | .36 | .35 | .32 | .32 |
| 9 | .41 | .39 | .38 | .37 | .35 | .35 |
| 10 | .43 | .41 | .40 | .39 | .37 | .36 |
| 11 | .46 | .44 | .42 | .41 | .39 | .37 |
| 12 | .48 | .46 | .44 | .42 | .41 | .38 |
| 13 | .50 | .48 | .46 | .44 | .43 | .40 |
| 14 | .52 | .50 | .47 | .46 | .44 | .40 |
| 15 | .54 | .52 | .49 | .47 | .45 | .41 |
| 16 | .55 | .53 | .50 | .48 | .45 | .41 |
| 17 | .56 | .54 | .52 | .50 | .46 | .42 |
| 18 | .58 | .56 | .53 | .52 | .46 | .42 |
| 19 | .60 | .58 | .54 | .53 | .47 | .43 |
| 20 | .61 | .59 | .55 | .54 | .47 | .43 |

| FRACTION OF $CaSO_4$ REACTED WITH $WO_3$ (AS A FUNCTION OF TIME) | | | | | | | | | |
|---|---|---|---|---|---|---|---|---|---|
| Temperature (K) | Table 8 1125 | | | Table 9 1175 | | | Table 10 1225 | | |
| Ratio of sulfate:oxide | .5 | 1.0 | 2.0 | .5 | 1.0 | 2.0 | .5 | 1.0 | 2.0 |
| Time (minutes) | | | | | | | | | |
| 1 | .01 | .01 | .01 | .02 | .03 | .02 | .05 | .04 | .05 |
| 2 | .02 | .02 | .02 | .04 | .06 | .05 | .10 | .08 | .09 |
| 3 | .02 | .02 | .03 | .06 | .08 | .07 | .15 | .12 | .15 |
| 4 | .03 | .03 | .04 | .08 | .09 | .09 | .20 | .17 | .18 |
| 5 | .04 | .03 | .05 | .10 | .11 | .11 | .24 | .19 | .22 |
| 6 | .05 | .04 | .06 | .12 | .13 | .12 | .29 | .23 | .26 |
| 7 | .06 | .05 | .06 | .13 | .15 | .14 | .32 | .25 | .29 |
| 8 | .07 | .06 | .07 | .15 | .16 | .15 | .35 | .30 | .32 |
| 9 | .07 | .06 | .07 | .17 | .17 | .17 | .39 | .33 | .33 |
| 10 | .08 | .07 | .08 | .18 | .18 | .18 | .42 | .36 | .35 |
| 11 | .08 | .07 | .08 | .19 | .20 | .20 | .44 | .38 | .36 |
| 12 | .09 | .08 | .09 | .21 | .21 | .21 | .47 | .41 | .37 |
| 13 | .09 | .08 | .09 | .22 | .22 | .22 | .49 | .43 | .37 |
| 14 | .10 | .09 | .10 | .23 | .23 | .23 | .51 | .45 | .38 |
| 15 | .10 | .10 | .10 | .25 | .24 | .24 | .52 | .46 | .38 |
| 16 | .11 | .10 | .11 | .26 | .25 | .25 | .54 | .47 | .39 |
| 17 | .11 | .11 | .11 | .27 | .26 | .26 | .56 | .49 | .39 |
| 18 | .12 | .11 | .12 | .28 | .28 | .27 | .57 | .50 | .39 |
| 19 | .13 | .12 | .12 | .29 | .29 | .27 | .58 | .52 | .40 |
| 20 | .13 | .12 | .13 | .30 | .30 | .28 | .59 | .53 | .40 |

| FRACTION OF CaSO₄ REACTED WITH (WO₃ + MoO₃) AS A FUNCTION OF TIME | | | | | | | | | |
|---|---|---|---|---|---|---|---|---|---|
| Temperature (K) | Table 11 1125 | | | Table 12 1175 | | | Table 13 1225 | | |
| Ratio of sulfate:oxide | .5 | 1.0 | 2.0 | .5 | 1.0 | 2.0 | .5 | 1.0 | 2.0 |
| Time (minutes) | | | | | | | | | |
| 1 | .03 | .03 | .03 | .10 | .10 | .07 | .22 | .16 | .10 |
| 2 | .08 | .08 | .06 | .20 | .14 | .10 | .29 | .18 | .13 |
| 3 | .11 | .11 | .07 | .28 | .17 | .11 | .31 | .20 | .16 |
| 4 | .15 | .12 | .08 | .29 | .18 | .13 | .31 | .21 | .18 |
| 5 | .17 | .13 | .08 | .29 | .18 | .14 | .31 | .22 | .20 |
| 6 | .20 | .14 | .09 | .29 | .19 | .15 | .31 | .23 | .22 |
| 7 | .23 | .14 | .09 | .29 | .19 | .16 | .31 | .24 | .24 |
| 8 | .25 | .15 | .09 | .30 | .20 | .17 | .31 | .25 | .26 |
| 9 | .25 | .15 | .10 | .30 | .20 | .18 | .31 | .25 | .27 |
| 10 | .26 | .15 | .10 | .30 | .21 | .19 | .32 | .26 | .29 |
| 11 | .26 | .15 | .10 | .30 | .21 | .20 | .32 | .27 | .30 |
| 12 | .26 | .15 | .11 | .30 | .22 | .21 | .32 | .28 | .31 |
| 13 | .26 | .16 | .11 | .30 | .22 | .22 | .32 | .28 | .32 |
| 14 | .26 | .16 | .11 | .30 | .22 | .23 | .32 | .29 | .33 |
| 15 | .26 | .16 | .12 | .30 | .23 | .24 | .32 | .30 | .34 |
| 16 | .26 | .16 | .12 | .30 | .23 | .25 | .33 | .30 | .34 |
| 17 | .27 | .17 | .12 | .30 | .24 | .26 | .33 | .31 | .35 |
| 18 | .27 | .17 | .13 | .30 | .24 | .27 | .33 | .32 | .36 |
| 19 | .27 | .17 | .13 | .30 | .24 | .28 | .33 | .32 | .36 |
| 20 | .27 | .17 | .13 | .30 | .25 | .28 | .33 | .33 | .37 |

It was observed that when the oxide was such that it alone or in conjunction with the sulfate formed a liquid system, the reaction rate was much improved as compared with situations where no liquid was present. Compare, for example, Table 8 with Table 1 (both at a temperature of 1125° K.).

Figure 2:
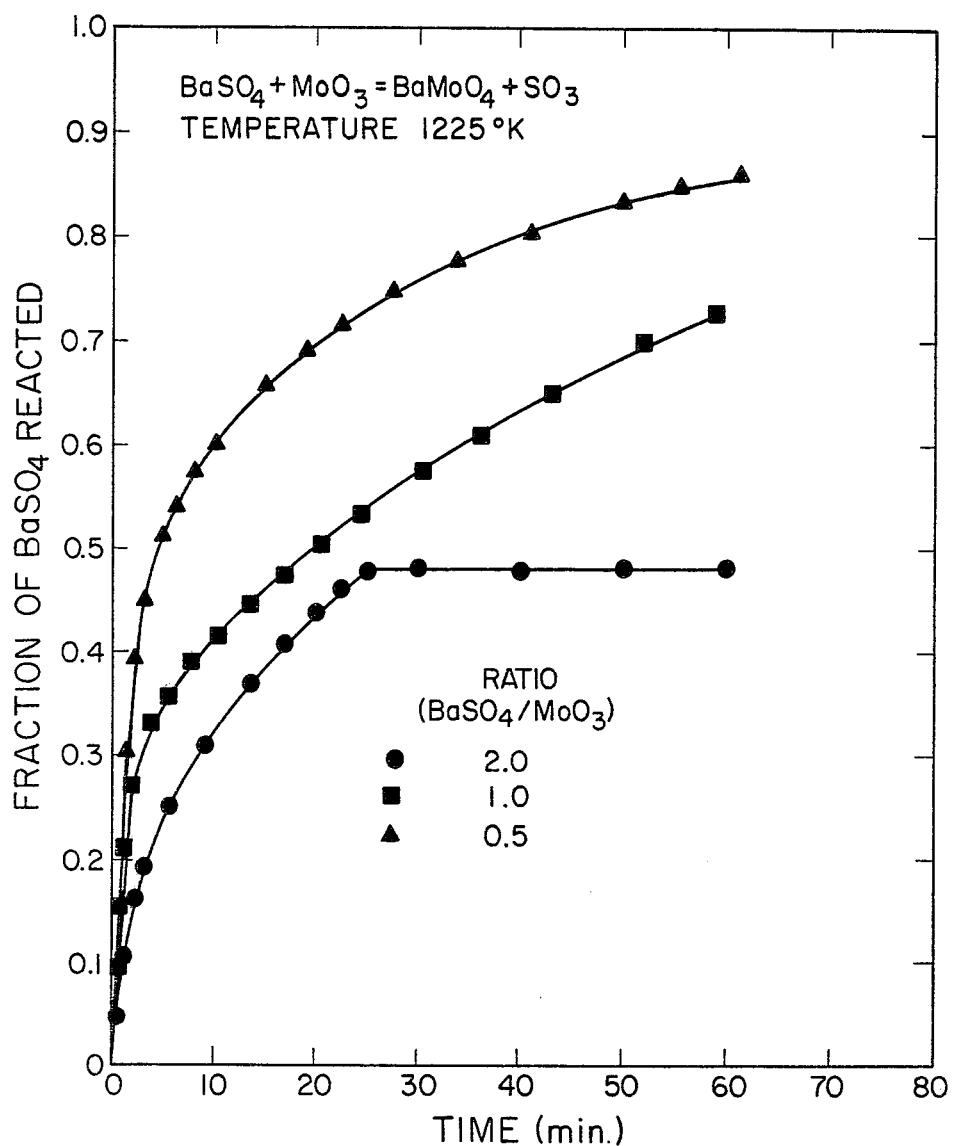
FIG. 2 shows three graphs of fraction of $BaSO_4$ reacted with $MoO_3$ as a function of time at 1225° K.
Figure 3:
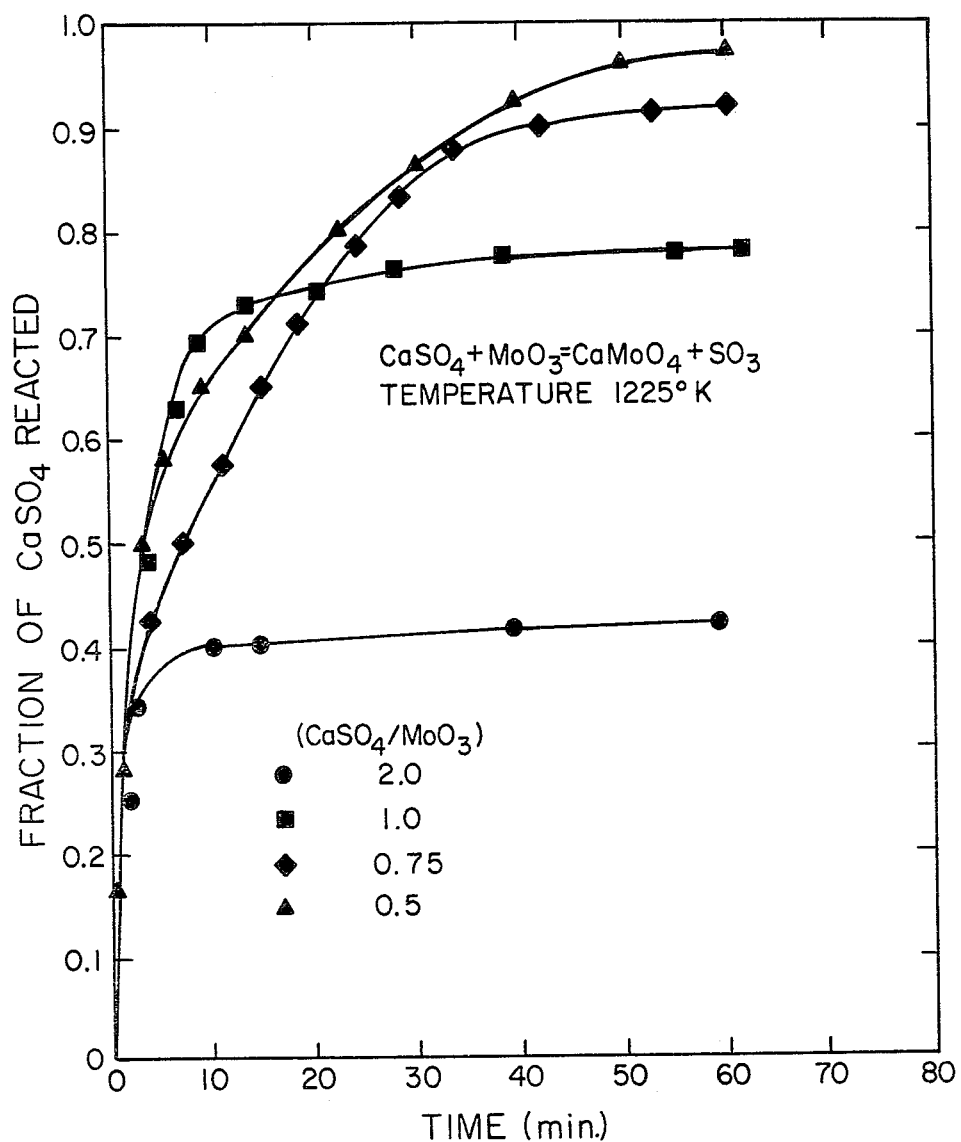
FIG. 3 shows four graphs of fraction of $CaSO_4$ reacted with $MoO_3$ as a function of time at 1225° K.

It should be noted that all of the combined sulfate and oxide systems investigated can be used as part of the process according to the invention. However, the combination of molybdenum oxide with either calcium sulfate or barium sulfate appears to give the fastest reaction rate at any selected temperature and appears to react to the greatest extent, at least for the first ten minutes of the reaction. Therefore these are preferred combinations of reactants for use in the process of the invention. In FIGS. 2 and 3, the information found in Tables 3 and 6, respectively, is given in graphical form, the slope of each graph at any time giving the reaction rate at that time. The steep slopes should be noted.

The foregoing description of a preferred embodiment of the invention has been presented for purposes of illustration and description and is not intended to be exhaustive or to limit the invention to the precise form disclosed. It was chosen and described in order to best explain the principles of the invention and their practical application to thereby enable others skilled in the art to best utilize the invention in various embodiments and with various modifications as are suited to the particular use contemplated. It is intended that the scope of the invention be defined by the claims appended hereto.

What is claimed is:

1. A process for producing hydrogen comprising:

(1) passing an electric current from a cathode to an anode through water containing sulfur dioxide so as to produce hydrogen gas at the cathode and so as to oxidize the sulfur dioxide to form sulfuric acid at the anode, thus producing an aqueous solution of sulfuric acid;

(2) separating said hydrogen gas from said aqueous solution of sulfuric acid;

(3) adding to said aqueous solution of sulfuric acid at least one compound selected from the group consisting of $M_rX_s$, wherein M is at least one metal ion selected from the group consisting of $Ba^{+2}$, $Ca^{+2}$, $Sr^{+2}$, $La^{+3}$, and $Pb^{+2}$, wherein X is at least one radical selected from the group consisting of molybdate, tungstate, and metaborate, wherein r is an integer selected from the group consisting of 1 and 2, wherein s is an integer selected from the group consisting of 1, 2, and 3, producing a mixture of at least one water insoluble sulfate of M and at least one water insoluble oxide of molybdenum, tunsten, or boron;

(4) filtering said mixture of water insoluble sulfate and water insoluble oxide;

(5) heating said mixture of water insoluble sulfate and water insoluble oxide to a sulfate decomposition temperature which is sufficiently high to form sulfur trioxide gas and to reform said $M_rX_s$;

(6) separating said sulfur trioxide gas from said $M_rX_s$ which was reformed in step (5); and (7) recycling said $M_rX_s$ to step (3) above.

2. A method according to claim 1 and including also the steps of decomposing said sulfur trioxide gas by heating to a sufficiently high temperature to re-form sulfur dioxide and to form oxygen gas by heating to a sufficiently high temperature to re-form sulfur dioxide and to form oxygen gas and then separating said sulfur dioxide from said oxygen.

3. A method according to claim 2 and including also the step of recycling to step (1) said sulfur dioxide which was formed by decomposing said sulfur trioxide.

4. A method according to claim 3 or claim 1 wherein said sulfate decomposition temperature is sufficiently high to melt said water insoluble oxide in the presence of said water insoluble sulfate.

5. A method according to claim 4, wherein said aqueous solution of sulfuric acid had a sulfuric acid concentration less than about 1 molar.

6. A method according to claim 5 and including also the step of drying said mixture of water insoluble sulfate and water insoluble oxide after it has been filtered and before it is heated to said sulfate decomposition temperature, so as to remove water from said mixture.

7. A method according to claim 6, wherein said radical is molybdate, wherein M is selected from the group consisting of $Ba^{+2}$ and $Ca^{+2}$, and wherein said sulfate decomposition temperature is within the range from about 1125° to about 1275° K.

8. A method according to claim 3, wherein said radical is molybdate, wherein M is selected from the group consisting of $Ba^{+2}$ and $Ca^{+2}$, and wherein said sulfate decomposition temperature is within the range from about 1125° to about 1275° K.

9. A method of producing concentrated sulfuric acid and hydrogen gas comprising the method according to claim 1 and including also the step of dissolving said sulfur trioxide in a small amount of water so as to produce concentrated sulfuric acid.

10. A method according to claim 1 and including also the step of drying said mixture of water insoluble sulfate and water insoluble oxide after it has been filtered and before it is heated to said sulfate decomposition temperature, so as to remove water from said mixture.

* * * * *